United States Patent
Ishii et al.

[11] Patent Number: 6,064,531
[45] Date of Patent: May 16, 2000

[54] ZOOM LENS SYSTEM

[75] Inventors: Atsujiro Ishii, Hoya; Noriyuki Iyama, Hachioji, both of Japan

[73] Assignee: Olympus Optical Co., Ltd., Tokyo, Japan

[21] Appl. No.: 08/985,931

[22] Filed: Dec. 5, 1997

[30] Foreign Application Priority Data

Dec. 6, 1996 [JP] Japan .................................. 8-326457
Jun. 3, 1997 [JP] Japan .................................. 9-145356

[51] Int. Cl.$^7$ .................................................. G02B 15/14
[52] U.S. Cl. ................................................ 359/689; 359/683
[58] Field of Search ................................ 359/689, 686, 359/676, 683

[56] References Cited

U.S. PATENT DOCUMENTS

| | | | |
|---|---|---|---|
| 4,444,893 | 4/1984 | Mader et al. ............................. | 501/72 |
| 5,086,356 | 2/1992 | Kojima et al. ........................... | 359/686 |
| 5,353,160 | 10/1994 | Ogata ..................................... | 359/689 |
| 5,825,556 | 10/1998 | Meyers ................................... | 359/690 |
| 5,886,829 | 3/1999 | Goosey, Jr. ............................. | 359/689 |

FOREIGN PATENT DOCUMENTS 4-260016 9/1992 Japan .
5-188296 7/1993 Japan .

*Primary Examiner*—Georgia Epps
*Assistant Examiner*—Jordan M. Schwartz
*Attorney, Agent, or Firm*—Pillsbury Madison & Sutro LLP

[57] ABSTRACT

A zoom lens system for use on compact cameras, which has a high zoom ratio, is provided at a minimum cost. The zoom lens system comprises a first positive lens group G1, a second positive lens group G2 and a third negative lens group G3 with a focal length of the system varied with changes in spacings between the lens groups. The first lens group G1 comprises one positive lens and one negative lens, and the third lens group G3 consists of one negative plastic lens. The zoom lens system satisfies $$1 < (r_{2F} + r_{2R})/(r_{2F} - r_{2R}) < 6$$

where $r_{2F}$ is a radius of curvature of a surface of the negative lens in the first lens group that faces the object side of the system and $r_{2R}$ is a radium of curvature of a surface of the negative lens in the first lens group that faces the image side of the system.

13 Claims, 7 Drawing Sheets

ZOOM LENS SYSTEM

BACKGROUND OF THE INVENTION

1. Field of the Invention

The present invention relates generally to a zoom lens system, and more particularly to a zoom lens system for use on compact cameras.

2. Description of Related Art

Among zoom lens systems known so far in the art, there are a two-group zoom lens system comprising a first lens group of positive power and a second lens group of negative power, with its focal length varied with a change in the spacing between them, and a three-group zoom lens system comprising a first lens group of positive power, a second lens group of positive power and a third lens group of negative power, wherein the focal length of the system is varied with changes in the spacings between the respective lens groups. The two-group zoom lens system is favorable for cost reductions because it is simpler in lens barrel construction and drive mechanism, and has a smaller number of lenses, than the three-group zoom lens system. To achieve as high a zoom ratio as possible and compactness, however, the three-group zoom lens system is preferable to the two-group zoom lens system. Typical three-group zoom lens systems are disclosed in JP-A's 4-260016 and 5-188296 wherein cost reductions are achieved by minimizing the number of lenses. The former comprises a first lens group consisting of one positive lens, a second lens group consisting of one negative lens and one positive lens and a third lens group consisting of one negative lens, and the latter comprises a first lens group consisting of one negative lens and one positive lens, a second lens group consisting of one negative lens and one positive lens or only one positive lens and a third lens group consisting of one negative lens.

One approach to achieving further cost reductions of zoom lens systems for use on compact cameras is to use plastic lenses. JP-A 4-260016 discloses an example of using plastic lenses for the negative lens of the third lens group and the positive lens in the second lens group. However, the zoom ratio obtained in this example is less than 2 as can be seen from a focal length of about 35 mm to 60 mm. JP-A 5-188296 achieves a zoom ratio of about 2 in an example wherein the second lens group consists of two lenses. Since the lenses of this example are all constructed of glass lenses, however, no satisfactory cost reductions are still achievable.

SUMMARY OF THE INVENTION

In view of such prior art problems, an object of the present invention is to provide a zoom lens system for use on compact cameras, which achieves a high zoom ratio at a minimum cost.

According to one aspect of the present invention for accomplishing the aforesaid object, there is provided a zoom lens system comprising, in order from an object side of said system, a first positive lens group, a second positive lens group and a third negative lens group with a focal length of said system varied with a change in spacings between said lens groups, wherein said first lens group comprises one positive lens and one negative lens, and said third lens group consists of one negative plastic lens.

According to another aspect of the present invention, there is provided a zoom lens system comprising, in order from an object side of said system, a first positive lens group, a second positive lens group and a third negative lens group with a focal length of said system varied with a change in spacings between said lens groups, wherein said first lens group consists of two lenses, a positive lens and a negative meniscus lens concave toward an image side of said system in order from the object side of said system.

In the second aspect of the present invention, it is preferable that the first lens group consists of two lenses, a positive lens and a negative meniscus lens concave toward the image side of the system in order from the object side of the system, with a space located between said positive lens and said negative lens.

In the second aspect of the present invention, it is preferable to satisfy the following condition (1):

$$1 < (r_{2F} + r_{2R})/(r_{2F} - r_{2R}) < 6 \tag{1}$$

Here $r_{2F}$ is a radius of curvature of a surface of the negative lens in the first lens group that faces the object side of the system and $r_{2R}$ is a radius of curvature of a surface of the negative lens in the first lens group that faces the image side of the system.

When there is a space between the positive and negative lenses in the first lens group, it is preferable to satisfy the following condition (2):

$$-1 < (r_{1R} - r_{2F})/(r_{1R} + r_{2F}) \leq 0 \tag{2}$$

Here $r_{1R}$ is a radius of curvature of a surface of the positive lens in the first lens group that faces the image side of the system and $r_2F$ is a radius of curvature of the negative lens in the first lens group that faces the object side of the system.

The aforesaid aspects of the present invention are explained more specifically with reference to the features and advantages thereof.

Plastic lenses can be fabricated at lower costs as compared with glass lenses. However, they have some disadvantages; that is, their index of refraction is limited to a relatively low value of the order of approximately 1.5 due to the fact that materials of which they are formed are limited, their surface accuracy is somewhat inferior to glass lens surface accuracy, their properties vary depending on temperature and humidity changes, etc. It is thus often difficult to unconditionally substitute plastic lenses for glass lenses. It is therefore required to use plastic lenses while their disadvantages are reduced as much as possible. The influence of a deterioration of the aforesaid surface accuracy on performance, and the effect of temperature and humidity changes on the overall performance of a lens system are substantially proportional to the square of the ray height of axial rays.

In a three-group zoom lens system of the positive-positive-negative power profile type such as one intended in the present invention, it is preferable to use a plastic lens in the third lens group where the height of axial rays is lowest, because the effect of temperature and humidity changes is lowest. In view of cost-effectiveness, it is best to use a plastic lens in the third lens group because the negative lens forming the third lens group has the largest diameter and requires the highest cost for polishing and other processing of glass material. For these reasons, it is most effective to use a plastic lens for a negative lens in a third lens group in a lens system such as one contemplated in the present invention. In addition, since the plastic lens can be easily formed into an aspheric shape, the third lens group can be constructed of one negative lens.

To make sure of a zoom ratio of approximately 2 or higher, it is required to reduce fluctuations of chromatic aberrations incidental to zooming by reducing chromatic aberrations produced at the first lens group. To this end, it is required that the first lens group be constructed of at least one positive lens and at least one negative lens. In this regard, it is desired that the positive lens and the negative lens be a cemented lens to prevent the introduction of higher-order aberrations.

In the second lens group, too, at least one positive and at least one negative lens are preferably used to make correction for chromatic aberrations, so that a zoom ratio of at least 2 can be accomplished. If a plastic lens is used for at least the positive lens of these lenses, additional cost reductions can then be achieved. In a zoom lens system such as one intended in the present invention, the power of the positive lens in the second lens group is strong, but its change with temperature can be reduced to some extent by interaction with the negative lens in the third lens group. If, at the same time, the negative lens is made up of a plastic lens, better temperature compensation is achievable with further cost reductions. In view of the correction of aberrations, it is most desirable that the second lens group be made up of, in order from the object side of the system, a negative meniscus lens with a stronger concave surface directed toward the object side of the system and one or two positive lenses. If, in this arrangement, at least one surface is formed of an aspheric shape of positive power that decreases farther off an optical axis of the system, it is then possible to make good correction for astigmatism and coma on the wide-angle side of the system.

In the zoom lens system of the present invention, it is desired that the first surface of the first lens group be convex toward the object side of the system so as to reduce the occurrence of aberrations with respect to off-axis incident rays. If, in this case, the first lens group is made up of a negative lens and a positive lens in order from the object side of the system, the negative lens then takes the form of a meniscus lens having a large curvature on the image side of the system, resulting in a polishing cost rise. If the first lens group is made up of a positive lens and a negative lens in order from the object side of the system, however, the negative lens can then take the form of a meniscus lens having a relatively gently concave surface directed toward the image side of the system, and so is favorable in view of cost. It is then preferable that the positive lens is in a meniscus form convex toward the object side of the system and the negative lens is in a meniscus form concave toward the image side of the system. In view of the correction of aberrations, it is preferable for the negative lens to satisfy the following condition (1):

$$1<(r_{2F}+r_{2R})/(r_{2F}-r_{2R})<6 \quad (1)$$

Here $r_{2F}$ is a radius of curvature of a surface of the negative lens in the first lens group that faces the object side of the system and $r_{2R}$ is a radius of curvature of a surface of the negative lens in the first lens group that faces the image side of the system.

It is undesirable that the lower limit of 1 in condition (1) is not reached, because the negative lens takes the form of a double-concave lens and, consequently, the angle of incidence of off-axis rays on the respective surfaces of the first lens group becomes large, resulting in an increase in the amount of astigmatism and coma produced. It is again undesirable that the upper limit of 6 is exceeded, because the meniscus shape of the negative lens becomes too strong, resulting in an increase in the amount of spherical aberration that is produced at the first lens group and becomes positive on the telephoto side of the system. In addition, it is desired that the positive and negative lenses in the first lens group be a cemented lens so as to prevent higher-order aberrations from being produced at opposite lens surfaces, as previously noted.

When the positive and negative lenses are cemented together in the first lens group, it is possible to reduce higher-order aberrations produced at the opposite lens surfaces of the positive and negative lenses and, hence, minimize performance loss due to misalignment during assembly.

When the zooming space is shifted to the wide-angle side of the system, and especially when the following condition (3) is satisfied, on the other hand, it is desired that the positive and negative lenses be independently provided in the first lens group.

$$0.65<f_w/Y<0.81 \quad (3)$$

Here $f_w$ is a focal length of the system on the wide-angle side of the system and Y is a diagonal length of an image plane.

When the system is constructed as a wide-angle system, some considerable field of curvature and distortion are produced. By making use of higher-order field of curvature and distortion produced at the opposite lens surfaces of the positive and negative lenses, therefore, it is desired to make correction for aberrations.

At this time, it is desired that the positive and negative lenses satisfy the following condition (2):

$$-1<(r_{1R}-r_{2F})/(r_{1R}+r_{2F})\leq 0 \quad (2)$$

Here $r_{1R}$ is a radius of curvature of a surface of the positive lens in the first lens group that faces the image side of the system and $r_2F$ is a radius of curvature of the negative lens in the first lens group that faces the object side of the system. It is undesirable that the lower limit of −1 in condition (2) is not reached because higher-order aberrations are produced in excess. It is again undesirable that the upper limit of 0 is exceeded because the amount of higher-order aberrations produced becomes too small to make correction for higher-order aberrations.

Specifically, with reference to a zoom lens system which, albeit meeting condition (3), has a zoom ratio of up to 2, the first lens group may be made up of a cemented lens consisting of a positive lens and a negative lens.

When the first lens group is made up of one positive lens and one negative lens, it is preferable that the second lens group is made up of, in order from the object side of the system, an aperture stop, a negative meniscus lens that is concave toward the object side of the system and a positive lens, with one surface of said positive lens being in an aspheric shape that has a positive power decreasing farther off an optical axis of the system, and satisfies the following condition (4):

$$0.27<D_1/\Sigma D<0.5 \quad (4)$$

Here $D_1$ is a spacing between the aperture stop and the negative lens and $\Sigma D$ is a distance from the aperture stop to a surface of the positive lens that faces the image side of the system.

Condition (4) gives a definition of the ratio between the spacing between the aperture stop and the negative lens in the second lens group and the distance from the aperture stop to the surface of the positive lens that faces the image side of the system. For the zoom lens system according to the present invention, it is preferable to make the distance between the aspheric surface and the aperture stop in the second lens group as large as possible to make correction for astigmatism and coma on the wide-angle side of the system in particular. It is thus preferable to provide between the aperture stop and the positive lens having such an aspheric surface a spacing wide enough to achieve compactness. On the other hand, the positive and negative lenses in the second lens group should each have power enough to correct for chromatic aberrations because the chromatic aberrations must be corrected throughout the second lens group. However, it is noted that the negative lens in the second lens group is in a meniscus form that is concave toward the aperture stop in such a manner as to reduce the occurrence of astigmatism and coma. Even so, the power of the negative lens is insufficient for the correction of chromatic aberrations because the amount of astigmatism and coma produced becomes larger at a position closer to the aperture stop. It is thus required to allow for a suitable spacing between the negative lens and the aperture stop. The ratio $D_1/\Sigma D$ that is lower than the lower limit of 0.27 in condition (4) is not preferable for the correction of aberrations. At higher than the upper limit of 0.5 compactness is not achieved or it is difficult to make sure of the thickness of the positive lens in the second lens group.

For the zoom lens system according to the present invention, it is preferable that at least one surface of the negative lens forming the third lens group is in an aspheric shape that has a negative power decreasing farther off the optical axis of the system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
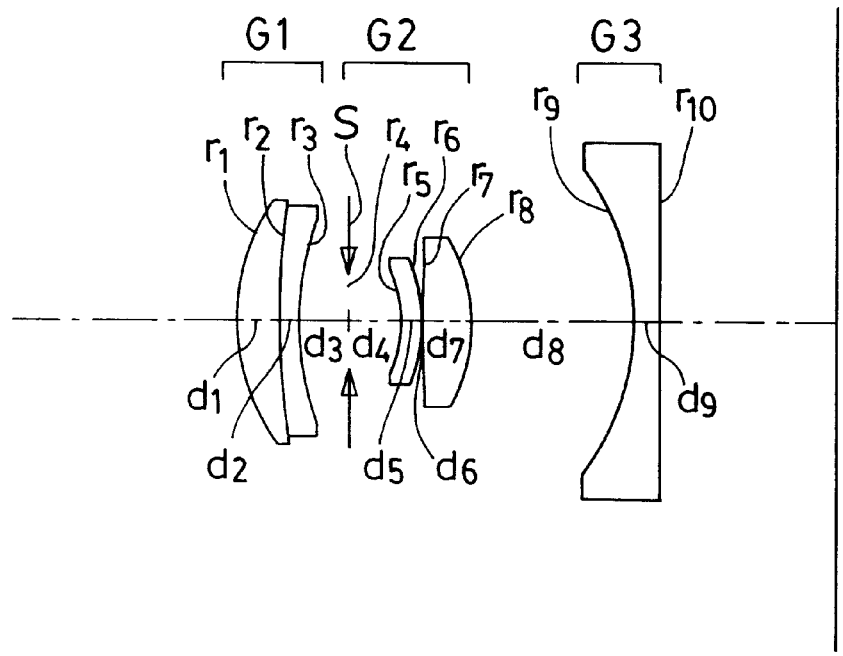
FIGS. 1(a) and 1(b) are sectional schematic illustrations of Example 1 of the zoom lens system according to the invention at the wide-angle, and telephoto ends, respectively.
Figure 1B:
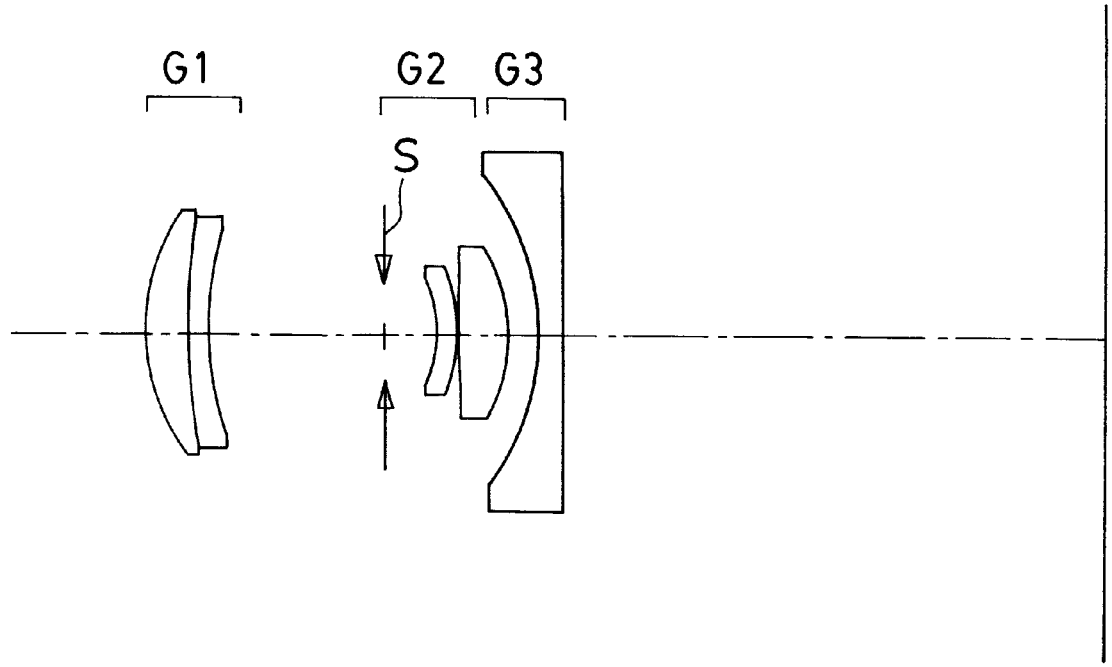

Examples 1 to 12 of the zoom lens system according to the invention are given. FIGS. 1(a) and 1(b) are a sectional schematics illustrative of the positions and constructions of lens groups in Example 1 at a wide-angle end FIG. 1(a), and a telephoto end FIG. 1(b). Similarly, FIGS. 2 to 11 are sectional schematics of Examples 2, 3, 4, 6, 7, 8, 9, 10, 11, and 12 at wide-angle ends. Example 5 is not illustrated because it is substantially similar to Example 2, and Example 13 is not illustrated because it is substantially similar to Example 8.

Example 1 is made up of a first positive lens group G1, a second positive lens group G2 and a third negative lens group G3, as can be seen from FIG. 1(a). All three lens groups move toward an object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a positive meniscus lens that is convex toward the object side and a negative meniscus lens. The second lens group G2 is made up of an aperture stop S, a negative meniscus lens that is concave toward the object side and a positive meniscus lens that is concave toward the object side. The third lens that is group G3 is made up of a negative meniscus lens concave toward the object side. Two aspheric surfaces are used, one for a surface of the second lens group G2 that is nearest to the image side and another for a surface of the third lens group G3 that is nearest to the object side. The positive meniscus lens in the second lens group G2 and the negative meniscus lens forming the third lens group G3 are plastic lenses.

Figure 2:
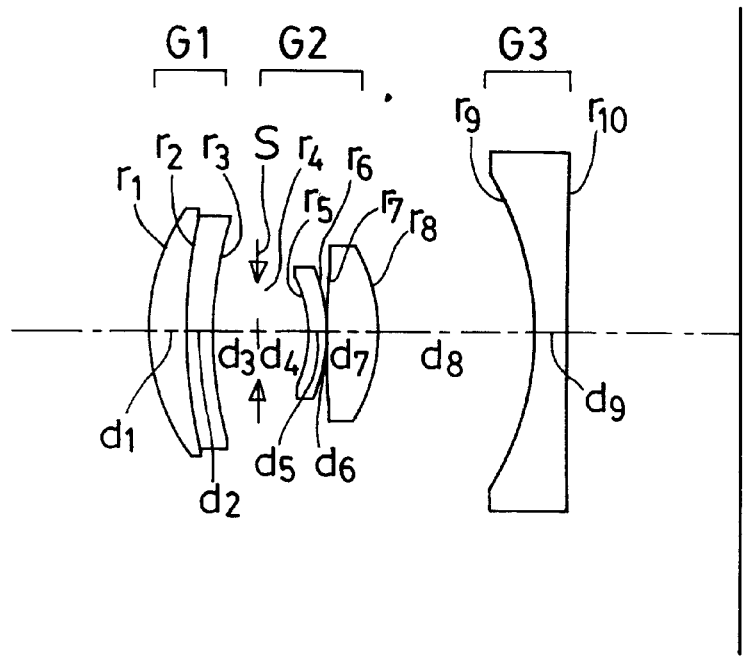
FIG. 2 is a sectional schematic of Example 2 of the zoom lens system according to the invention at the wide-angle end.

Example 2 is made up of a first positive lens group G1, a second positive lens group G2 and a third negative lens group G3, as can be seen from FIG. 2. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a positive meniscus lens that is convex toward the object side and a negative meniscus lens. The second lens group G2 is made up of an aperture stop S, a negative meniscus lens that is concave toward the object side and a positive meniscus lens that is concave toward the object side. The third lens group G3 is made up of a double-concave lens. Two aspheric surfaces are used, one for a surface of the second lens group G2 that is nearest to the image side and another for a surface of the third lens group G3 that is nearest to the object side. The positive meniscus lens in the second lens group G2 and the double-concave lens forming the third lens group G3 are plastic lenses.

Figure 3:
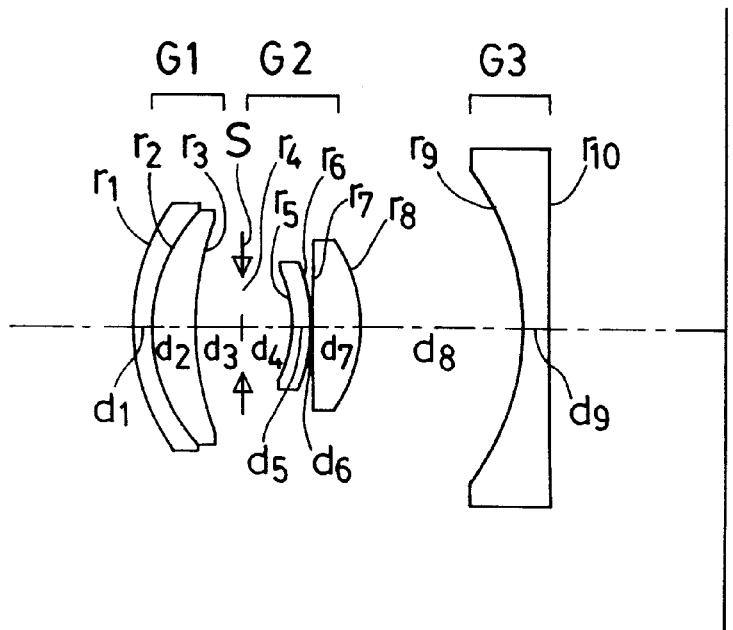
FIG. 3 is a sectional schematic of Example 3 of the zoom lens system according to the invention at the wide-angle end.

Example 3 is made up of a first positive lens group G1, a second positive lens group G2 and a third negative lens group G3, as can be seen from FIG. 3. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a negative meniscus lens that is convex toward the object side and a positive meniscus lens. The second lens group G2 is made up of an aperture stop S, a negative meniscus lens that is concave toward the object side and a positive meniscus lens that is concave toward the object side. The third lens group G3 is made up of a double-concave lens. Two aspheric surfaces are used, one for a surface of the second lens group G2 that is nearest to the image side and another for a surface of the third lens group G3 that is nearest to the object side. The positive meniscus lens in the second lens group G2 and the double-concave lens forming the third lens group G3 are plastic lenses.

Figure 4:
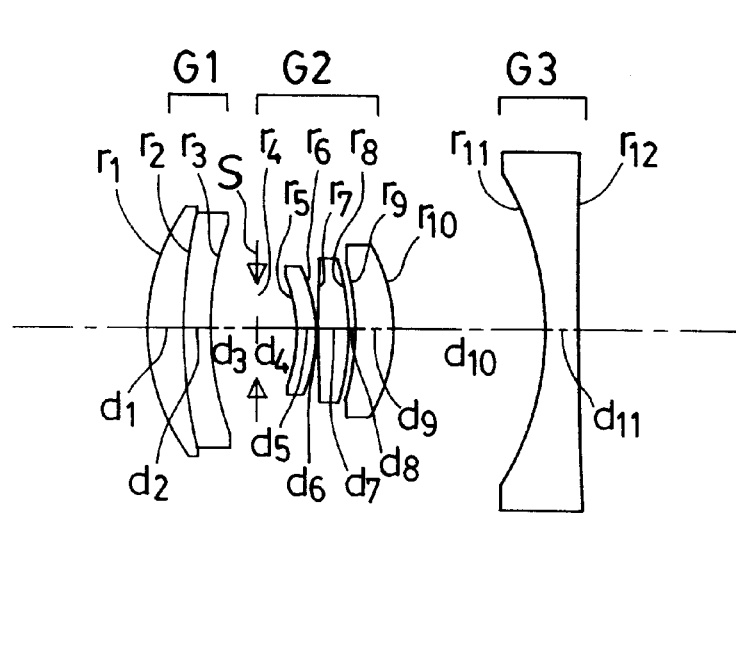
FIG. 4 is a sectional schematic of Example 4 of the zoom lens system according to the invention at the wide-angle end.

Example 4 is made up of a first positive lens group G1, a second positive lens group G2 and a third negative lens group G3, as can be seen from FIG. 4. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a positive meniscus lens that is convex toward the object side and a negative meniscus lens. The second lens group G2 is made up of an aperture stop S, a negative meniscus lens that is concave toward the object side, a positive meniscus lens that is concave toward the object side and a positive meniscus lens that is concave toward the object side. The third lens group G3 is made up of a double-concave lens. Two aspheric surfaces are used, one for a surface of the second lens group G2 that is nearest to the image side and another for a surface of the third lens group G3 that is nearest to the object side. The positive meniscus lens nearest to the image side in the second lens group G2 and the double-concave lens forming the third lens group G3 are plastic lenses.

Example 5 is made up of a first positive lens group G1, a second positive lens group G2 and a third negative lens group G3, as in Example 2. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a positive meniscus lens that is convex toward the object side and a negative meniscus lens. The second lens group G2 is made up of an aperture stop S, a negative meniscus lens that is concave toward the object side and a positive meniscus lens that is concave toward the object side. The third lens group G3 is made up of a double-concave lens. Two aspheric surfaces are used, one for a surface of the second lens group G2 that is nearest to the image side and another for a surface of the third lens group G3 that is nearest to the object side. The positive meniscus lens in the second lens group G2 and the double-concave lens forming the third lens group G3 are plastic lenses.

Figure 5:
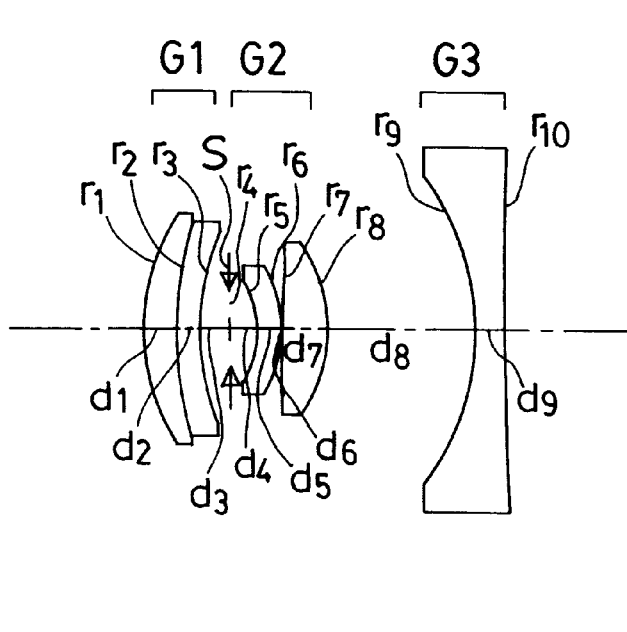
FIG. 5 is a sectional schematic of Example 6 of the zoom lens system according to the invention at the wide-angle end.

Example 6 is made up of a first positive lens group G1, a second positive lens group G2 and a third negative lens group G3, as can be seen from FIG. 5. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a positive meniscus lens that is convex toward the object side and a negative meniscus lens. The second lens group G2 is made up of an aperture stop S, a negative meniscus lens that is concave toward the object side and a double-convex lens. The third lens group G3 is made up of a double-concave lens. Two aspheric surfaces are used, one for a surface of the second lens group G2 that is nearest to the image side and another for a surface of the third lens group G3 that is nearest to the object side. The double-convex lens in the second lens group G2 and the double-concave lens forming the third lens group G3 are plastic lenses.

Figure 6:
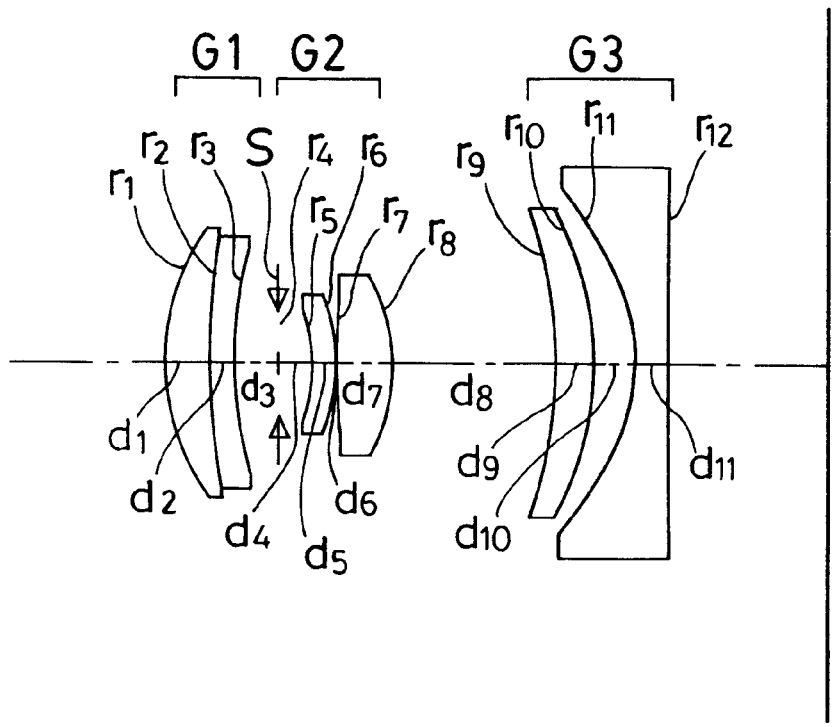
FIG. 6 is a sectional schematic of Example 7 of the zoom lens system according to the invention at the wide-angle end.

Example 7 is made up of a first positive lens group G1, a second positive lens group G2 and a third negative lens group G3, as can be seen from FIG. 6. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a positive meniscus lens that is convex toward the object side and a negative meniscus lens. The second lens group G2 is made up of an aperture stop S, a negative meniscus lens that is concave toward the object side and a positive meniscus lens that is concave toward the object side. The third lens group G3 is made up of a positive meniscus lens that is concave toward the object side and a double-concave lens. Two aspheric surfaces are used, one for a surface of the second lens group G2 that is nearest to the image side and another for a surface of the double-concave lens in the third lens group G3 that faces the object side. The positive meniscus lens in the second lens group G2 and the double-concave lens in the third lens group G3 are plastic lenses.

Figure 7:
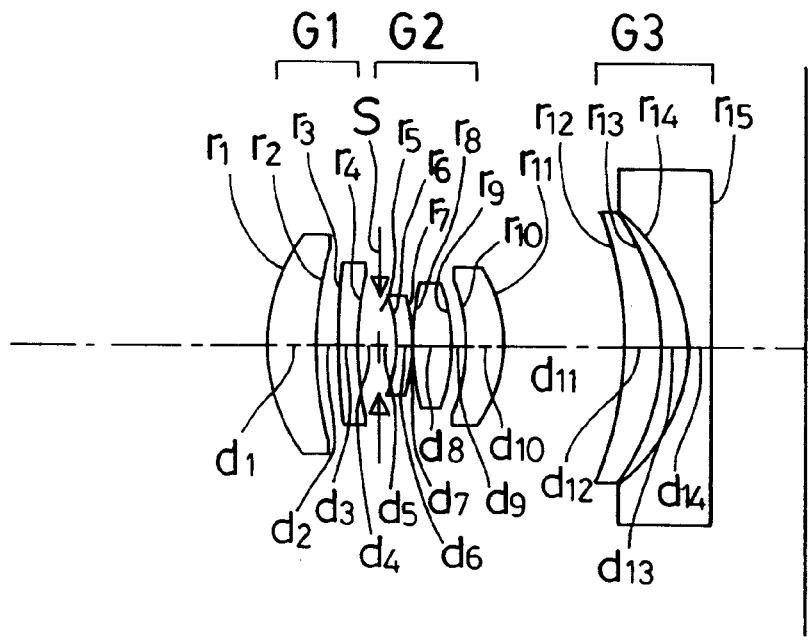
FIG. 7 is a sectional schematic of Example 8 of the zoom lens system according to the invention at the wide-angle end.

Example 8 is made up of a first positive lens group G1, a second positive lens group G2 and a third negative lens group G3, as can be seen from FIG. 7. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a positive meniscus lens that is convex toward the object side and a negative meniscus lens that is concave toward the image side, said negative meniscus lens being located on the image side and at an air spacing with respect to said positive meniscus lens. The second lens group G2 is made up of an aperture stop S, a negative meniscus lens that is concave toward the object side, a double-convex lens and a positive meniscus lens that are concave on the object side. The third lens group G3 is made up of a positive meniscus lens that is concave toward the object side and a negative meniscus lens that is concave toward the object side. Two aspheric surfaces are used, one for a surface of the double-convex lens in the second lens group G2 that faces the image side and another for a surface of the third lens group G3 that is nearest to the object side.

Figure 8:
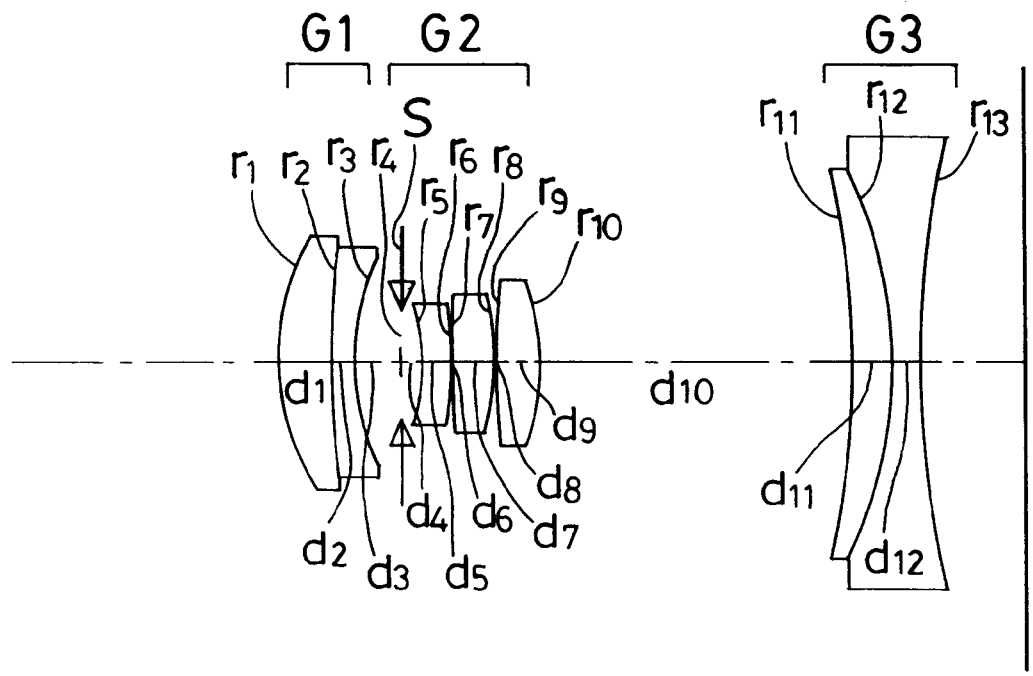
FIG. 8 is a sectional schematic of Example 9 of the zoom lens system according to the invention at the wide-angle end.

Example 9 is made up of a first positive lens group G1, a second positive lens group G2 and a third negative lens group G3, as can be seen from FIG. 8. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a doublet consisting of a positive meniscus lens that is convex toward the object side and a negative meniscus lens that is convex toward the object side. The second lens group G2 is made up of an aperture stop S, a negative meniscus lens that is concave toward the object side and two double-convex lenses. The third lens group G3 is made up of a doublet consisting of a positive meniscus lens that is concave toward the object side and a double-concave lens. Two aspheric surfaces are used, one for a surface of the second lens group G2 that is nearest to the image side and another for a surface of the third lens group G3 that is nearest to the object side.

Figure 9:
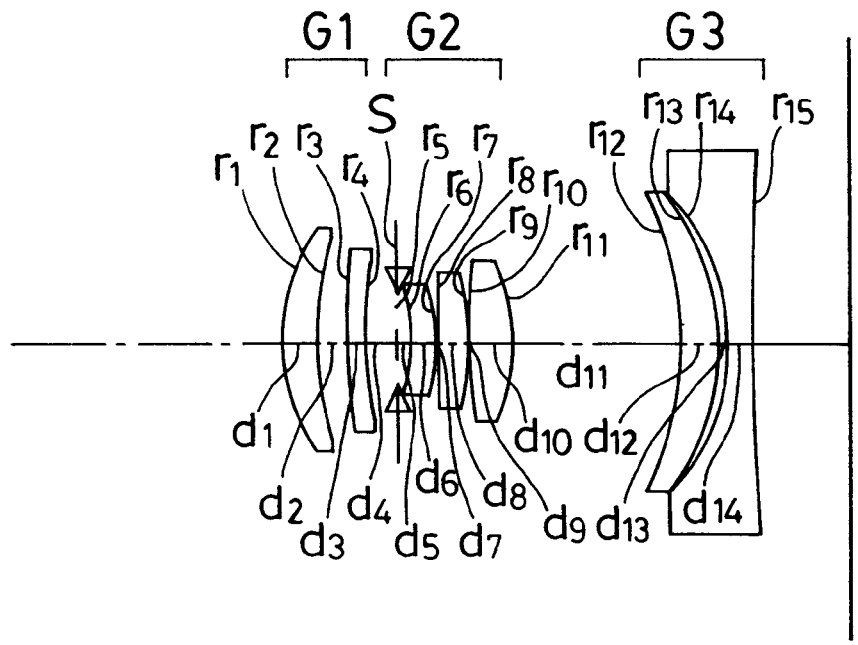
FIG. 9 is a sectional schematic of Example 10 of the zoom lens system according to the invention at the wide-angle end.

Example 10 is made up of a first positive lens group G1, a second positive lens group G2 and a third negative lens group G3, as can be seen from FIG. 9. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a positive meniscus lens that is convex toward the object side and a negative meniscus lens that is concave toward the image side, said negative meniscus lens being located on the image side and at an air spacing with respect to said positive meniscus lens. The second lens group G2 is made up of an aperture stop S, a negative meniscus lens that is concave toward the object side and two double-convex lenses. The third lens group G3 is made up of a positive meniscus lens that is concave toward the object side and a double-concave lens. Two aspheric surfaces are used, one for a surface of the second lens group G2 that is nearest to the image side and another for a surface of the positive meniscus lens in the third lens group G3 that faces the image side.

Figure 10:
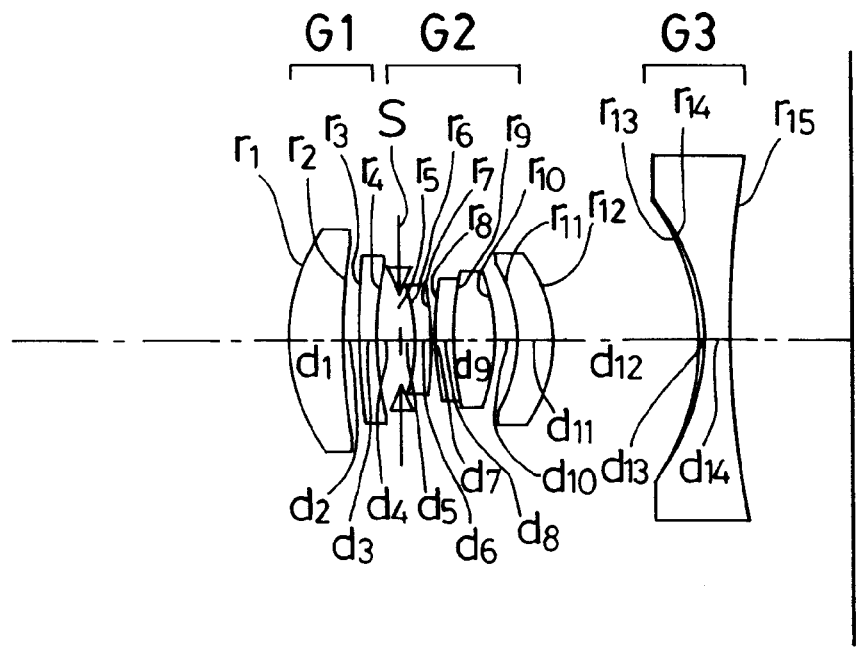
FIG. 10 is a sectional schematic of Example 11 of the zoom lens system according to the invention at the wide-angle end.

Example 11 is made up of a first positive lens group G1, a second positive lens group G2 and a third negative lens group G3, as can be seen from FIG. 10. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a positive meniscus lens that is convex toward the object side and a negative meniscus lens that is concave toward the image side, said negative meniscus lens being located on the image side and at an air spacing with respect to said positive meniscus lens. The second lens group G2 is made up of an aperture stop S, a negative meniscus lens that is concave toward the object side, a doublet consisting of a negative meniscus lens that is convex toward the object side and a double-convex lens that has a lower index of refraction and a larger Abbe number than said negative meniscus lens and a positive meniscus lens that is concave toward the object side. The third lens group G3 is made up of a double-concave lens with a compound type aspheric surface located on the object side. Two aspheric surfaces are used, one for a surface of the doublet in the second lens group G2 that is nearest to the image side and another for a surface of the third lens group G3 that is nearest to the image side.

Figure 11:
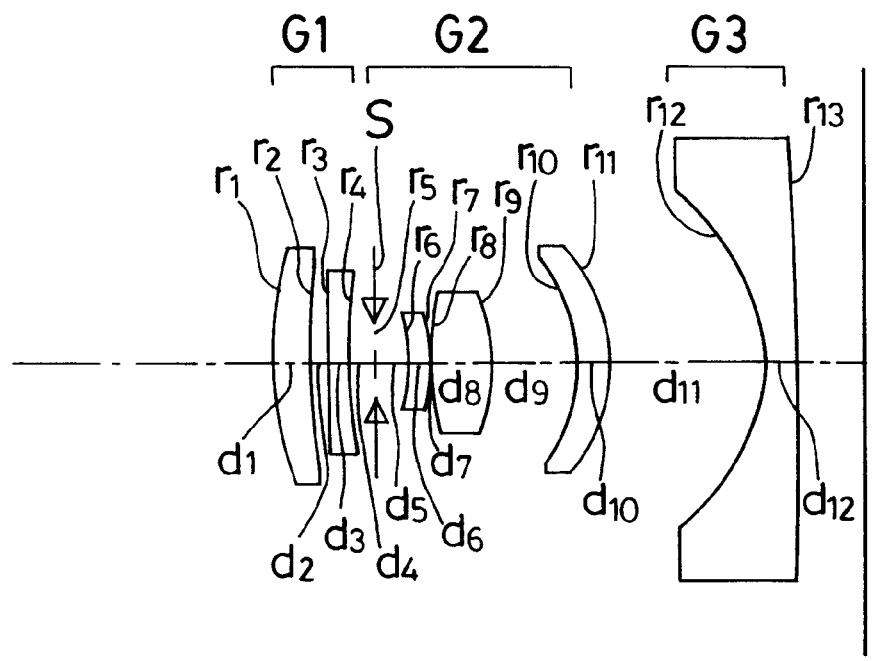
FIG. 11 is a sectional schematic of Example 12 of the zoom lens system according to the invention at the wide-angle end.

Example 12 is made up of a first positive lens group G1, a second positive lens group G2 and a third negative lens group G3, as can be seen from FIG. 11. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a positive meniscus lens that is convex toward the object side and a negative meniscus lens that is concave toward the image side, said negative meniscus lens being located on the image side and at an air spacing with respect to said positive meniscus lens. The second lens group G2 is made up of an aperture stop S, a negative meniscus lens that is concave toward the object side, a double-convex lens and a positive meniscus lens that is concave toward the object side. The third lens group G3 is made up of a negative meniscus lens that is concave toward the object side. Five aspheric surfaces are used, one for a surface of the positive meniscus lens in the first lens group G1 that faces the object side, one for a surface of the negative meniscus lens in the first lens group G1 that faces the object side, one for a surface of the double-convex lens in the second lens group G2 that faces the image side, one for a surface of the positive meniscus lens in the second lens group G2 that faces the image side, and one for a surface of the third lens group G3 that faces the object side. The positive meniscus lens in the second lens group G2 and the negative meniscus lens forming the third lens group G3 are plastic lenses.

Example 13 is made up of a first positive lens group G1, a second positive lens group G2 and a third negative lens group G3, as in Example 8. All three lens groups move toward the object side of the system while, from the wide-angle to telephoto end, the spacing between the first and second lens groups G1 and G2 increases with a decrease in the spacing between the second and third lens groups G2 and G3. The first lens group G1 is made up of a positive meniscus lens that is convex toward the object side and a negative meniscus lens that is concave toward the image side, said negative meniscus lens being located on the image side and at an air spacing with respect to said positive meniscus lens. The second lens group G2 is made up of an aperture stop S, a negative meniscus lens that is concave toward the object side, a double-convex lens and a positive meniscus lens that is concave toward the object side. The third lens group G3 is made up of a positive meniscus lens that is concave toward the object side and a negative meniscus lens that is concave toward the object side. Two aspheric surfaces are used, one for a surface of the positive meniscus lens in the second lens group G2 that faces the object side and another for a surface of the third lens group G3 that is nearest to the object side.

Enumerated below are numerical data for each example. Symbols used hereinafter, but not hereinbefore, have the following meanings. f=focal length of the overall system, $F_{NO}$=F-number, $f_B$=back focus, $r_1, r_2, \ldots$ =radii of curvature of lens surfaces, $d_1, d_2, \ldots$ =spacings between lens surfaces, $n_{d1}, n_{d2}, \ldots$ =d-line refractive indices of lenses, and $v_{d1}$, $V_{d2}, \ldots$ =Abbe number of lenses. Here let x represent an optical axis provided that the direction of propagation of light is positive and y denote a direction perpendicular to the optical axis. Then, the aspheric shape is given by $$x=(y^2/r)/[1+\{1-(K+1)(y/r)^2\}^{1/2}]+A_4Y^4+A_6Y^6+A_8Y^8+A_{10}Y^{10}$$

where r is a paraxial radius of curvature, K is a conical coefficient, and $A_4, A_6, A_8,$ and $A_{10}$ are fourth, sixth, eighth, and tenth aspherical coefficients.

Example 1 f = 36.119 ~67.454
$F_{NO}$ = 4.662 ~7.041
$f_B$ = 11.860 ~6.829

| | | |
|---|---|---|
| $r_1$ = 15.0519 | $d_1$ = 2.6000 | $n_{d1}$ = 1.72916  $v_{d1}$ = 54.68 |
| $r_2$ = 42.9565 | $d_2$ = 1.6368 | $n_{d2}$ = 1.84666  $v_{d2}$ = 23.78 |
| $r_3$ = 22.1906 | $d_3$ = (Variable) | |
| $r_4$ = ∞ (Stop) | $d_4$ = 3.5781 | |
| $r_5$ = −7.7012 | $d_5$ = 1.3226 | $n_{d3}$ = 1.58144  $v_{d3}$ = 40.77 |
| $r_6$ = −12.4925 | $d_6$ = 0.1000 | |
| $r_7$ = −618.1412 | $d_7$ = 3.5000 | $n_{d4}$ = 1.52542  $v_{d4}$ = 55.78 |
| $r_8$ = −9.4245(Aspheric) | $d_8$ = (Variable) | |
| $r_9$ = −14.1190(Aspheric) | $d_9$ = 1.9000 | $n_{d5}$ = 1.52542  $v_{d5}$ = 55.78 |
| $r_{10}$ = −1435.7758 | | |

Zooming Spaces

| f | 36.119 | 67.454 |
|---|---|---|
| $d_3$ | 3.27339 | 12.01227 |
| $d_8$ | 10.80040 | 2.00000 |

Aspherical Coefficients

8th surface
K = 0.0000

-continued $A_4 = 1.3146 \times 10^{-4}$
$A_6 = 1.6258 \times 10^{-6}$
$A_8 = -3.6740 \times 10^{-8}$
$A_{10} = 7.7579 \times 10^{-10}$
9th surface
$K = 0.0000$
$A_4 = 7.2761 \times 10^{-5}$
$A_6 = 4.7153 \times 10^{-7}$
$A_8 = -6.5433 \times 10^{-9}$
$A_{10} = 3.4156 \times 10^{-11}$
(1) $(r_{2F} + r_{2R})/(r_{2F} - r_{2R}) = 3.14$
(4) $D_1/\Sigma D = 0.42$ Example 2

| | $f = 36.166$ | $\sim 67.496$ |
|---|---|---|
| | $F_{NO} = 4.662$ | $\sim 7.041$ |
| | $f_B = 11.865$ | $\sim 36.682$ |

| $r_1 = 14.7086$ | $d_1 = 2.6000$ | $n_{d1} = 1.72916$ | $v_{d1} = 54.68$ |
|---|---|---|---|
| $r_2 = 38.5965$ | $d_2 = 1.6368$ | $n_{d2} = 1.84666$ | $v_{d2} = 23.78$ |
| $r_3 = 21.3065$ | $d_3 =$ (Variable) | | |
| $r_4 = \infty$ (Stop) | $d_4 = 3.4559$ | | |
| $r_5 = -7.0618$ | $d_5 = 1.3249$ | $n_{d3} = 1.58423$ | $v_{d3} = 30.49$ |
| $r_6 = -9.8480$ | $d_6 = 0.1000$ | | |
| $r_7 = -94.0367$ | $d_7 = 3.5000$ | $n_{d4} = 1.52542$ | $v_{d4} = 55.78$ |
| $r_8 = -9.7318$(Aspheric) | $d_8 =$ (Variable) | | |
| $r_9 = -14.7512$(Aspheric) | $d_9 = 1.9000$ | $n_{d5} = 1.52542$ | $v_{d5} = 55.78$ |
| $r_{10} = -455.8349$ | | | |

Zooming Spaces

| f | 36.166 | 67.496 |
|---|---|---|
| $d_3$ | 3.19434 | 11.97963 |
| $d_8$ | 10.83792 | 2.00000 |

Aspherical Coefficients

8th surface
$K = 0.0000$
$A_4 = 1.1626 \times 10^{-4}$
$A_6 = 1.1199 \times 10^{-6}$
$A_8 = -1.8065 \times 10^{-8}$
$A_{10} = 4.5837 \times 10^{-10}$
9th surface
$K = 0.0000$
$A_4 = 7.4813 \times 10^{-5}$
$A_6 = 5.3824 \times 10^{-7}$
$A_8 = -7.3038 \times 10^{-9}$
$A_{10} = 3.5522 \times 10^{-11}$
(1) $(r_{2F} + r_{2R})/(r_{2F} - r_{2R}) = 3.46$
(4) $D_1/\Sigma D = 0.41$ Example 3

| | $f = 36.122$ | $\sim 67.400$ |
|---|---|---|
| | $F_{NO} = 4.662$ | $\sim 7.041$ |
| | $f_B = 11.914$ | $\sim 37.204$ |

| $r_1 = 14.5303$ | $d_1 = 1.3000$ | $n_{d1} = 1.84666$ | $v_{d1} = 23.78$ |
|---|---|---|---|
| $r_2 = 10.9579$ | $d_2 = 3.1000$ | $n_{d2} = 1.72916$ | $v_{d2} = 54.68$ |
| $r_3 = 20.45408$ | $d_3 =$ (Variable) | | |
| $r_4 = \infty$ (Stop) | $d_4 = 3.4663$ | | |
| $r_5 = -7.4076$ | $d_5 = 1.3226$ | $n_{d3} = 1.58144$ | $v_{d3} = 40.77$ |
| $r_6 = -11.3081$ | $d_6 = 0.1000$ | | |
| $r_7 = -184.6695$ | $d_7 = 3.5000$ | $n_{d4} = 1.52542$ | $v_{d4} = 55.78$ |
| $r_8 = -9.4250$(Aspheric) | $d_8 =$ (Variable) | | |
| $r_9 = -14.5946$(Aspheric) | $d_9 = 1.9000$ | $n_{d5} = 1.52542$ | $v_{d5} = 55.78$ |
| $r_{10} = 2248.8290$ | | | |

Zooming Spaces

| f | 36.122 | 67.400 |
|---|---|---|
| $d_3$ | 3.04211 | 11.83650 |
| $d_8$ | 10.878446 | 2.00000 |

Aspherical Coefficients

8th surface
$K = 0.0000$
$A_4 = 1.2679 \times 10^{-4}$
$A_6 = 1.4227 \times 10^{-6}$
$A_8 = -3.1003 \times 10^{-8}$
$A_{10} = 7.1751 \times 10^{-10}$
9th surface -continued $K = 0.0000$
$A_4 = 7.1202 \times 10^{-5}$
$A_6 = 3.8413 \times 10^{-7}$
$A_8 = -5.2544 \times 10^{-9}$
$A_{10} = 2.7189 \times 10^{-11}$
(4) $D_1/\Sigma D = 0.41$ Example 4

| | $f = 36.183$ | $\sim 67.484$ |
|---|---|---|
| | $F_{NO} = 4.662$ | $\sim 7.041$ |
| | $f_B = 11.419$ | $\sim 35.711$ |

| $r_1 = 14.7652$ | $d_1 = 2.6000$ | $n_{d1} = 1.72916$ | $v_{d1} = 54.68$ |
|---|---|---|---|
| $r_2 = 39.0982$ | $d_2 = 1.6368$ | $n_{d2} = 1.84666$ | $v_{d2} = 23.78$ |
| $r_3 = 21.4210$ | $d_3 =$ (Variable) | | |
| $r_4 = \infty$ (Stop) | $d_4 = 2.8842$ | | |
| $r_5 = -7.5212$ | $d_5 = 1.3226$ | $n_{d3} = 1.58423$ | $v_{d3} = 30.49$ |
| $r_6 = -9.8985$ | $d_6 = 0.1000$ | | |
| $r_7 = -77.1727$ | $d_7 = 2.0000$ | $n_{d4} = 1.60311$ | $v_{d4} = 55.78$ |
| $r_8 = -16.2564$ | $d_8 = 0.4000$ | | |
| $r_9 = -18.3334$ | $d_9 = 2.5000$ | $n_{d5} = 1.52542$ | $v_{d5} = 55.78$ |
| $r_{10} = -11.8898$(Aspheric) | $d_{10} =$ (Variable) | | |
| $r_{11} = -14.7576$(Aspheric) | $d_{11} = 19.000$ | $n_{d6} = 1.52542$ | $v_{d6} = 55.78$ |
| $r_{12} = 266.6584$ | | | |

Zooming Spaces

| f | 36.183 | 67.484 |
|---|---|---|
| $d_3$ | 3.28192 | 11.96239 |
| $d_{10}$ | 10.71795 | 2.00000 |

Aspherical Coefficients

10th surface
$K = 0.0000$
$A_4 = 9.2198 \times 10^{-5}$
$A_6 = 1.7733 \times 10^{-7}$
$A_8 = 4.0587 \times 10^{-12}$
$A_{10} = 1.1523 \times 10^{-10}$
11th surface
$K = 0.0000$
$A_4 = 7.5635 \times 10^{-5}$
$A_6 = 4.6872 \times 10^{-7}$
$A_8 = -6.3734 \times 10^{-9}$
$A_{10} = 3.1727 \times 10^{-11}$
(1) $(r_{2F} + r_{2R})/(r_{2F} - r_{2R}) = 3.42$ Example 5

| | $f = 39.402$ | $\sim 87.211$ |
|---|---|---|
| | $F_{NO} = 4.662$ | $\sim 7.041$ |
| | $f_B = 10.042$ | $\sim 44.938$ |

| $r_1 = 19.0847$ | $d_1 = 2.6000$ | $n_{d1} = 1.72916$ | $v_{d1} = 54.68$ |
|---|---|---|---|
| $r_2 = 65.8892$ | $d_2 = 1.6368$ | $n_{d2} = 1.84666$ | $v_{d2} = 23.78$ |
| $r_3 = 31.9528$ | $d_3 =$ (Variable) | | |
| $r_4 = \infty$ (Stop) | $d_4 = 3.1795$ | | |
| $r_5 = -8.1925$ | $d_5 = 1.4736$ | $n_{d3} = 1.76200$ | $v_{d3} = 40.10$ |
| $r_6 = -11.2501$ | $d_6 = 0.1000$ | | |
| $r_7 = -62.5390$ | $d_7 = 3.5000$ | $n_{d4} = 1.52542$ | $v_{d4} = 55.78$ |
| $r_8 = -10.5993$(Aspheric) | $d_8 =$ (Variable) | | |
| $r_9 = -17.6422$(Aspheric) | $d_9 = 1.9000$ | $n_{d5} = 1.52542$ | $v_{d5} = 55.78$ |
| $r_{10} = 358.3052$ | | | |

Zooming Spaces

| f | 39.401 | 87.211 |
|---|---|---|
| $d_3$ | 4.79207 | 19.06592 |
| $d_8$ | 16.29675 | 2.00000 |

Aspherical Coefficients

8th surface
$K = 0.0000$
$A_4 = 7.8623 \times 10^{-5}$
$A_6 = 2.0354 \times 10^{-7}$
$A_8 = 2.9005 \times 10^{-10}$
$A_{10} = 1.9184 \times 10^{-10}$
9th surface
$K = 0.0000$
$A_4 = 3.2557 \times 10^{-5}$
$A_6 = 4.1676 \times 10^{-7}$
$A_8 = -3.9523 \times 10^{-9}$ $A_{10} = 1.2630 \times 10^{-11}$
(1) $(r_{2F} + r_{2R})/(r_{2F} - r_{2R}) = 2.88$
(4) $D_1/\Sigma D = 0.39$ Example 6

$f = 29.223 \sim 54.890$
$F_{NO} = 4.662 \sim 7.267$
$f_B = 9.072 \sim 31.246$

| | | | |
|---|---|---|---|
| $r_1 = 12.4541$ | $d_1 = 2.6000$ | $n_{d1} = 1.72916$ | $v_{d1} = 54.68$ |
| $r_2 = 26.5305$ | $d_2 = 1.6368$ | $n_{d2} = 1.84666$ | $v_{d2} = 23.78$ |
| $r_3 = 16.0072$ | $d_3 =$ (Variable) | | |
| $r_4 = \infty$ (Stop) | $d_4 = 2.0883$ | | |
| $r_5 = -6.4805$ | $d_5 = 1.3249$ | $n_{d3} = 1.58423$ | $v_{d3} = 30.49$ |
| $r_6 = -9.2467$ | $d_6 = 0.1000$ | | |
| $r_7 = 244.8718$ | $d_7 = 3.5000$ | $n_{d4} = 1.52542$ | $v_{d4} = 55.78$ |
| $r_8 = -9.0513$(Aspheric) | $d_8 =$ (Variable) | | |
| $r_9 = -13.3998$(Aspheric) | $d_9 = 1.9000$ | $n_{d5} = 1.52542$ | $v_{d5} = 55.78$ |
| $r_{10} = 231.7527$ | | | |

Zooming Spaces

| f | 29.223 | 54.890 |
|---|---|---|
| $d_3$ | 2.03957 | 19.06592 |
| $d_8$ | 9.72064 | 2.00000 |

Aspherical Coefficients

8th surface
$K = 0.0000$
$A_4 = 1.7671 \times 10^{-4}$
$A_6 = 1.5098 \times 10^{-6}$
$A_8 = -1.7252 \times 10^{-8}$
$A_{10} = 5.2783 \times 10^{-10}$
9th surface
$K = 0.0000$
$A_4 = 1.0284 \times 10^{-4}$
$A_6 = 6.4630 \times 10^{-7}$
$A_8 = -9.5925 \times 10^{-9}$
$A_{10} = 4.9389 \times 10^{-11}$
(1) $(r_{2F} + r_{2R})/(r_{2F} - r_{2R}) = 4.04$
(4) $D_1/\Sigma D = 0.30$ Example 7

$f = 36.270 \sim 69.826$
$F_{NO} = 4.662 \sim 7.041$
$f_B = 9.885 \sim 35.379$

| | | | |
|---|---|---|---|
| $r_1 = 15.5144$ | $d_1 = 2.6000$ | $n_{d1} = 1.65160$ | $v_{d1} = 58.52$ |
| $r_2 = 40.5816$ | $d_2 = 1.6368$ | $n_{d2} = 1.84666$ | $v_{d2} = 23.78$ |
| $r_3 = 25.5818$ | $d_3 =$ (Variable) | | |
| $r_4 = \infty$ (Stop) | $d_4 = 2.3321$ | | |
| $r_5 = -8.0334$ | $d_5 = 1.3226$ | $n_{d3} = 1.84666$ | $v_{d3} = 23.78$ |
| $r_6 = -10.6708$ | $d_6 = 0.1000$ | | |
| $r_7 = -135.1863$ | $d_7 = 3.5000$ | $n_{d4} = 1.52542$ | $v_{d4} = 55.78$ |
| $r_8 = -10.5016$(Aspheric) | $d_8 =$ (Variable) | | |
| $r_9 = -26.3278$ | $d_9 = 2.5000$ | $n_{d5} = 1.63980$ | $v_{d5} = 34.48$ |
| $r_{10} = -19.7764$ | $d_{10} = 2.4990$ | | |
| $r_{11} = -11.4612$(Aspheric) | $d_{11} = 19.000$ | $n_{d6} = 1.52542$ | $v_{d6} = 55.78$ |
| $r_{12} = 530.5874$ | | | |

Zooming Spaces

| f | 36.270 | 69.826 |
|---|---|---|
| $d_3$ | 2.76333 | 12.01498 |
| $d_8$ | 10.27424 | 1.00000 |

Aspherical Coefficients

8th surface
$K = 0.0000$
$A_4 = 1.0518 \times 10^{-4}$
$A_6 = -1.2249 \times 10^{-6}$
$A_8 = 7.0692 \times 10^{-8}$
$A_{10} = -9.2855 \times 10^{-10}$
11th surface
$K = 0.0000$
$A_4 = 8.5254 \times 10^{-5}$
$A_6 = 9.4307 \times 10^{-7}$
$A_8 = -1.2857 \times 10^{-8}$
$A_{10} = 9.7299 \times 10^{-11}$ (1) $(r_{2F} + r_{2R})/(r_{2F} - r_{2R}) = 4.41$
(4) $D_1/\Sigma D = 0.32$ Example 8

$f = 25.7 \sim 67.6$
$F_{NO} = 4.42 \sim 10.58$
$f_B = 5.651 \sim 38.644$

| | | | |
|---|---|---|---|
| $r_1 = 11.661$ | $d_1 = 3.146$ | $n_{d1} = 1.60342$ | $v_{d1} = 38.03$ |
| $r_2 = 29.955$ | $d_2 = 1.163$ | | |
| $r_3 = 57.506$ | $d_3 = 1.000$ | $n_{d2} = 1.84666$ | $v_{d2} = 23.78$ |
| $r_4 = 18.214$ | $d_4 =$ (Variable) | | |
| $r_5 = \infty$ (Stop) | $d_5 = 0.857$ | | |
| $r_6 = -8.4406$ | $d_6 = 1.000$ | $n_{d3} = 1.72342$ | $v_{d3} = 37.95$ |
| $r_7 = -16.876$ | $d_7 = 0.200$ | | |
| $r_8 = 25.994$ | $d_8 = 2.506$ | $n_{d4} = 1.58313$ | $v_{d4} = 59.38$ |
| $r_9 = -9.089$(Aspheric) | $d_9 = 0.826$ | | |
| $r_{10} = -9.202$ | $d_{10} = 3.326$ | $n_{d5} = 1.48749$ | $v_{d5} = 70.23$ |
| $r_{11} = -7.663$ | $d_{11} =$ (Variable) | | |
| $r_{12} = -14.800$(Aspheric) | $d_{12} = 2.474$ | $n_{d6} = 1.72825$ | $v_{d6} = 28.46$ |
| $r_{13} = -12.985$ | $d_{13} = 1.578$ | | |
| $r_{14} = -9.893$ | $d_{14} = 1.400$ | $n_{d7} = 1.72916$ | $v_{d7} = 54.68$ |
| $r_{15} = -268.881$ | | | |

Zooming Spaces

| f | 25.7 | 67.6 |
|---|---|---|
| $d_4$ | 1.533 | 10.504 |
| $d_{11}$ | 7.458 | 1.000 |

Aspherical Coefficients

9th surface
$K = -1.79258$
$A_4 = 1.56653 \times 10^{-4}$
$A_6 = -3.50862 \times 10^{-6}$
$A_8 = 9.69137 \times 10^{-7}$
$A_{10} = -3.82850 \times 10^{-8}$
12th surface
$K = -0.99190$
$A_4 = 9.43340 \times 10^{-5}$
$A_6 = 7.39378 \times 10^{-7}$
$A_8 = -7.33012 \times 10^{-9}$
$A_{10} = 6.59712 \times 10^{-11}$
(1) $(r_{2F} + r_{2R})/(r_{2F} - r_{2R}) = 1.93$
(2) $(r_{1R} - r_{2F})/(r_{1R} + r_{2F}) = -0.315$
(3) $f_W/Y = 0.743$ Example 9

$f = 30.9 \sim 87.3$
$F_{NO} = 4.73 \sim 12.24$
$f_B = 5.957 \sim 72.061$

| | | | |
|---|---|---|---|
| $r_1 = 14.509$ | $d_1 = 3.131$ | $n_{d1} = 1.72825$ | $v_{d1} = 28.46$ |
| $r_2 = 59.407$ | $d_2 = 1.500$ | $n_{d2} = 1.84666$ | $v_{d2} = 23.78$ |
| $r_3 = 15.421$ | $d_3 =$ (Variable) | | |
| $r_4 = \infty$ (Stop) | $d_4 = 1.282$ | | |
| $r_5 = -9.164$ | $d_5 = 1.500$ | $n_{d3} = 1.80440$ | $v_{d3} = 39.59$ |
| $r_6 = -43.730$ | $d_6 = 0.250$ | | |
| $r_7 = 187.747$ | $d_7 = 2.432$ | $n_{d4} = 1.72916$ | $v_{d4} = 54.68$ |
| $r_8 = -17.170$ | $d_8 = 0.200$ | | |
| $r_9 = 54.599$ | $d_9 = 2.705$ | $n_{d5} = 1.48749$ | $v_{d5} = 70.23$ |
| $r_{10} = -12.639$(Aspheric) | $d_{10} =$ (Variable) | | |
| $r_{11} = -44.826$(Aspheric) | $d_{11} = 2.500$ | $n_{d6} = 1.72825$ | $v_{d6} = 28.46$ |
| $r_{12} = -23.967$ | $d_{12} = 1.500$ | $n_{d7} = 1.72916$ | $v_{d7} = 54.68$ |
| $r_{13} = 55.791$ | | | |

Zooming Spaces

| f | 30.9 | 87.3 |
|---|---|---|
| $d_3$ | 2.500 | 17.418 |
| $d_{10}$ | 18.260 | 1.000 |

Aspherical Coefficients

10th surface
$K = -0.06032$
$A_4 = 1.41765 \times 10^{-4}$
$A_6 = -2.34813 \times 10^{-6}$
$A_8 = 1.73134 \times 10^{-7}$
$A_{10} = -4.13829 \times 10^{-9}$ -continued 11th surface
K = −0.86622
$A_4 = 1.77658 \times 10^{-5}$
$A_6 = -1.96920 \times 10^{-7}$
$A_8 = 0$
$A_{10} = 3.45778 \times 10^{-12}$
(1) $(r_{2F} + r_{2R})/(r_{2F} - r_{2R}) = 1.70$ Example 10

| | f = 25.6 | ~72.7 |
|---|---|---|
| | $F_{NO}$ = 4.63 | ~11.51 |
| | $f_B$ = 5.400 | ~46.404 |

| | | | |
|---|---|---|---|
| $r_1$ = 11.720 | $d_1$ = 1.800 | $n_{d1}$ = 1.76200 | $v_{d1}$ = 40.10 |
| $r_2$ = 19.450 | $d_2$ = 1.768 | | |
| $r_3$ = 59.523 | $d_3$ = 1.000 | $n_{d2}$ = 1.84666 | $v_{d2}$ = 23.78 |
| $r_4$ = 23.164 | $d_4$ = (Variable) | | |
| $r_5$ = ∞ (Stop) | $d_5$ = 0.750 | | |
| $r_6$ = −8.183 | $d_6$ = 1.279 | $n_{d3}$ = 1.57501 | $v_{d3}$ = 41.50 |
| $r_7$ = −16.126 | $d_7$ = 0.166 | | |
| $r_8$ = 108.336 | $d_8$ = 1.687 | $n_{d4}$ = 1.60311 | $v_{d4}$ = 60.70 |
| $r_9$ = −28.293 | $d_9$ = 0.200 | | |
| $r_{10}$ = 54.397 | $d_{10}$ = 2.600 | $n_{d5}$ = 1.51633 | $v_{d5}$ = 64.14 |
| $r_{11}$ = −11.500(Aspheric) | $d_{11}$ = (Variable) | | |
| $r_{12}$ = −19.413 | $d_{12}$ = 2.200 | $n_{d6}$ = 1.72151 | $v_{d6}$ = 29.23 |
| $r_{13}$ = −15.735(Aspheric) | $d_{13}$ = 0.625 | | |
| $r_{14}$ = −12.296 | $d_{14}$ = 1.500 | $n_{d7}$ = 1.69680 | $v_{d7}$ = 56.47 |
| $r_{15}$ = −212.414 | | | |

Zooming Spaces

| f | 25.6 | 72.7 |
|---|---|---|
| $d_4$ | 2.100 | 12.264 |
| $d_{11}$ | 10.011 | 1.000 |

Aspherical Coefficients

11th surface
K = 0.21945
$A_4 = 2.07987 \times 10^{-4}$
$A_6 = -3.80627 \times 10^{-6}$
$A_8 = 1.80825 \times 10^{-7}$
$A_{10} = -3.20556 \times 10^{-9}$
13th surface
K = −1.12658
$A_4 = -5.88716 \times 10^{-5}$
$A_6 = 1.15526 \times 10^{-6}$
$A_8 = -1.46559 \times 10^{-8}$
$A_{10} = 1.33748 \times 10^{-10}$
(1) $(r_{2F} + r_{2R})/(r_{2F} - r_{2R}) = 2.27$
(2) $(r_{1R} - r_{2F})/(r_{1R} + r_{2F}) = -0.507$
(3) $f_W/Y = 0.740$ Example 11

| | f = 27.8 | ~72.6 |
|---|---|---|
| | $F_{NO}$ = 4.53 | ~9.86 |
| | $f_B$ = 7.298 | ~41.087 |

| | | | |
|---|---|---|---|
| $r_1$ = 11.001 | $d_1$ = 3.190 | $n_{d1}$ = 1.54814 | $v_{d1}$ = 45.79 |
| $r_2$ = 34.010 | $d_2$ = 1.123 | | |
| $r_3$ = 73.387 | $d_3$ = 1.000 | $n_{d2}$ = 1.84666 | $v_{d2}$ = 23.78 |
| $r_4$ = 24.053 | $d_4$ = (Variable) | | |
| $r_5$ = ∞ (Stop) | $d_5$ = 0.786 | | |
| $r_6$ = −11.357 | $d_6$ = 1.000 | $n_{d3}$ = 1.72916 | $v_{d3}$ = 54.68 |
| $r_7$ = −32.139 | $d_7$ = 0.200 | | |
| $r_8$ = 22.892 | $d_8$ = 1.000 | $n_{d4}$ = 1.84666 | $v_{d4}$ = 23.78 |
| $r_9$ = 14.691 | $d_9$ = 2.668 | $n_{d5}$ = 1.58313 | $v_{d5}$ = 59.38 |
| $r_{10}$ = −9.829(Aspheric) | $d_{10}$ = 1.384 | | |
| $r_{11}$ = −8.229 | $d_{11}$ = 2.288 | $n_{d6}$ = 1.69895 | $v_{d6}$ = 30.13 |
| $r_{12}$ = −7.828 | $d_{12}$ = (Variable) | | |
| $r_{13}$ = −10.639(Aspheric) | $d_{13}$ = 0.350 | $n_{d7}$ = 1.52288 | $v_{d7}$ = 52.50 |
| $r_{14}$ = −13.278 | $d_{14}$ = 1.500 | $n_{d8}$ = 1.48749 | $v_{d8}$ = 70.23 |
| $r_{15}$ = 57.842 | | | |

Zooming Spaces

| f | 27.8 | 72.6 |
|---|---|---|
| $d_4$ | 1.464 | 9.421 |
| $d_{12}$ | 8.768 | 1.000 |

Aspherical Coefficients

10th surface
K = −1.61115
$A_4 = 2.07866 \times 10^{-4}$
$A_6 = -4.64123 \times 10^{-6}$
$A_8 = 1.09961 \times 10^{-6}$
$A_{10} = -4.09480 \times 10^{-8}$
13th surface
K = −0.57518
$A_4 = 1.51294 \times 10^{-4}$
$A_6 = -1.47080 \times 10^{-9}$
$A_8 = 2.22744 \times 10^{-9}$
$A_{10} = -4.06807 \times 10^{-11}$
(1) $(r_{2F} + r_{2R})/(r_{2F} - r_{2R}) = 1.98$
(3) $f_W/Y = 0.803$
(2) $(r_{1R} - r_{2F})/(r_{1R} + r_{2F}) = -0.367$ Example 12

| | f = 23.2 | ~43.6 |
|---|---|---|
| | $F_{NO}$ = 5.56 | ~12.09 |
| | $f_B$ = 4.000 | ~32.537 |

| | | | |
|---|---|---|---|
| $r_1$ = 22.825(Aspheric) | $d_1$ = 2.105 | $n_{d1}$ = 1.64769 | $v_{d1}$ = 33.80 |
| $r_2$ = 53.412 | $d_2$ = 1.105 | | |
| $r_3$ = 480.513(Aspheric) | $d_3$ = 1.000 | $n_{d2}$ = 1.80610 | $v_{d2}$ = 40.92 |
| $r_4$ = 23.924 | $d_4$ = (Variable) | | |
| $r_5$ = ∞ (Stop) | $d_5$ = 1.975 | | |
| $r_6$ = −9.818 | $d_6$ = 0.100 | $n_{d3}$ = 1.64769 | $v_{d3}$ = 33.80 |
| $r_7$ = −14.681 | $d_7$ = 0.200 | | |
| $r_8$ = 13.165 | $d_8$ = 3.814 | $n_{d4}$ = 1.49700 | $v_{d4}$ = 81.54 |
| $r_9$ = −11.668(Aspheric) | $d_9$ = 5.329 | | |
| $r_{10}$ = −9.819 | $d_{10}$ = 2.000 | $n_{d5}$ = 1.52542 | $v_{d5}$ = 55.78 |
| $r_{11}$ = −8.572(Aspheric) | $d_{11}$ = (Variable) | | |
| $r_{12}$ = −9.371(Aspheric) | $d_{12}$ = 1.765 | $n_{d6}$ = 1.52542 | $v_{d6}$ = 55.78 |
| $r_{13}$ = −274.712 | | | |

Zooming Spaces

| f | 23.2 | 43.6 |
|---|---|---|
| $d_4$ | 1.871 | 12.827 |
| $d_{11}$ | 9.429 | 1.000 |

Aspherical Coefficients

1st surface
K = −0.29187
$A_4 = 6.83248 \times 10^{-6}$
$A_6 = -7.64792 \times 10^{-7}$
$A_8 = -3.00911 \times 10^{-9}$
$A_{10} = 0$
3rd surface
K = −1509.57818
$A_4 = -3.42342 \times 10^{-5}$
$A_6 = 1.93099 \times 10^{-6}$
$A_8 = -1.29620 \times 10^{-8}$
$A_{10} = 0$
9th surface
K = −0.09518
$A_4 = 1.33752 \times 10^{-4}$
$A_6 = 7.60038 \times 10^{-6}$
$A_8 = -3.68934 \times 10^{-7}$
$A_{10} = 6.33338 \times 10^{-9}$
11th surface
K = −0.44947
$A_4 = 1.14725 \times 10^{-4}$
$A_6 = -2.53817 \times 10^{-6}$
$A_8 = 7.63236 \times 10^{-8}$
$A_{10} = 2.52082 \times 10^{-10}$
12th surface
K = −0.74920
$A_4 = 4.06882 \times 10^{-5}$
$A_6 = -2.22908 \times 10^{-6}$
$A_8 = 3.79173 \times 10^{-8}$
$A_{10} = -1.64372 \times 10^{-10}$
(1) $(r_{2F} + r_{2R})/(r_{2F} - r_{2R}) = 1.11$
(2) $(r_{1R} - r_{2F})/(r_{1R} + r_{2F}) = -0.800$
(3) $f_W/Y = 0.671$ -continued Example 13

| | f = 27.9 | ~72.4 |
| | $F_{NO}$ = 4.66 | ~10.20 |
| | $f_B$ = 6.241 | ~37.435 |

| $r_1$ = 12.517 | $d_1$ = 2.649 | $n_{d1}$ = 1.72000 | $v_{d1}$ = 43.71 |
| $r_2$ = 37.286 | $d_2$ = 1.160 | | |
| $r_3$ = 44.419 | $d_3$ = 1.000 | $n_{d2}$ = 1.84666 | $v_{d2}$ = 23.78 |
| $r_4$ = 16.809 | $d_4$ = (Variable) | | |
| $r_5$ = ∞ (Stop) | $d_5$ = 0.641 | | |
| $r_6$ = −10.337 | $d_6$ = 1.385 | $n_{d3}$ = 1.75500 | $v_{d3}$ = 52.32 |
| $r_7$ = −29.356 | $d_7$ = 0.154 | | |
| $r_8$ = 19.843 | $d_8$ = 2.480 | $n_{d4}$ = 1.48749 | $v_{d4}$ = 70.23 |
| $r_9$ = −19.843 | $d_9$ = 0.453 | | |
| $r_{10}$ = −76.923(Aspheric) | $d_{10}$ = 2.814 | $n_{d5}$ = 1.56384 | $v_{d5}$ = 60.70 |
| $r_{11}$ = −11.058 | $d_{11}$ = (Variable) | | |
| $r_{12}$ = −13.957(Aspheric) | $d_{12}$ = 2.624 | $n_{d6}$ = 1.72151 | $v_{d6}$ = 29.24 |
| $r_{13}$ = −12.361 | $d_{13}$ = 1.462 | | |
| $r_{14}$ = −9.785 | $d_{14}$ = 1.400 | $n_{d7}$ = 1.69680 | $v_{d7}$ = 55.53 |
| $r_{15}$ = −250.000 | | | |

Zooming Spaces

| f | 27.9 | 72.4 |
| $d_4$ | 2.130 | 10.348 |
| $d_{11}$ | 7.891 | 1.109 |

Aspherical Coefficients

10th surface
K = −0.3240
$A_4$ = −2.9471 × $10^{-4}$
$A_6$ = 1.5965 × $10^{-6}$
$A_8$ = −2.3751 × $10^{-7}$
$A_{10}$ = 1.1018 × $10^{-8}$
12th surface
K = −0.6991
$A_4$ = 9.9874 × $10^{-5}$
$A_6$ = 7.3384 × $10^{-7}$
$A_8$ = −1.1891 × $10^{-8}$
$A_{10}$ = 1.5639 × $10^{-10}$
(1) $(r_{2F} + r_{2R})/(r_{2F} - r_{2R})$ = 2.22
(2) $(r_{1R} - r_{2F})/(r_{1R} + r_{2F})$ = −0.0873
(3) $f_W/Y$ = 0.808

Figure 12:
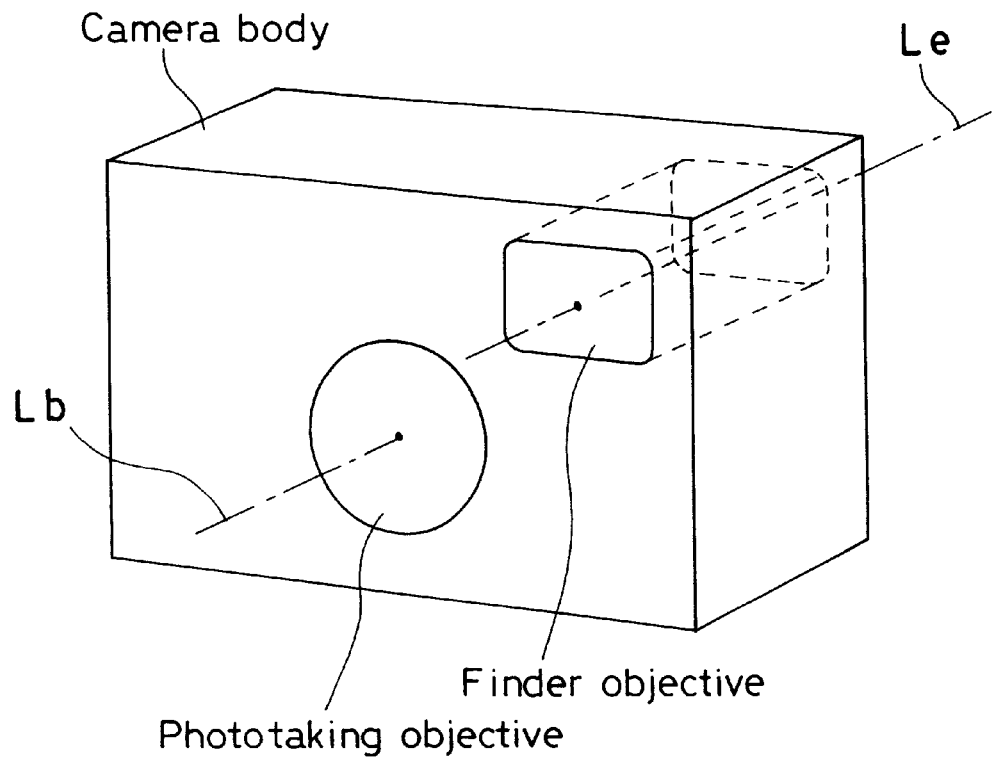
FIG. 12 is a perspective view of a compact camera to which the invention is applied.
Figure 13:
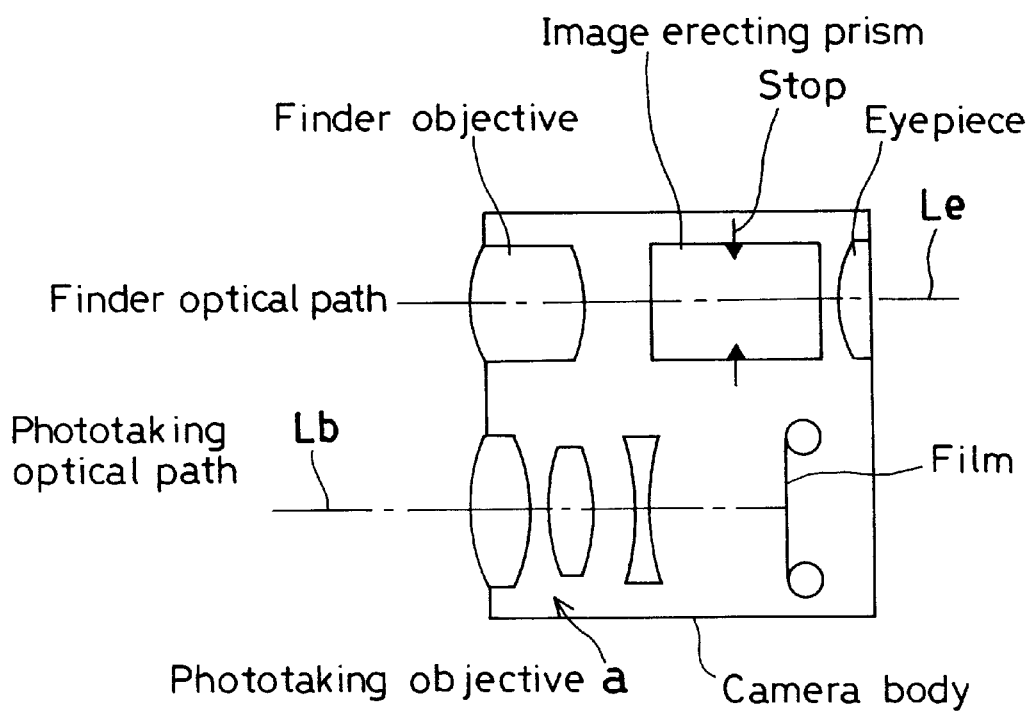
FIG. 13 is a sectional view of the compact camera.

The zoom lens of the invention as explained above may be used as a phototaking objective a of such a compact camera as shown perspectively in FIG. 12, and sectionally in FIG. 13. In these figures, $L_b$ and $L_e$ represent a phototaking optical path and a finder optical path, respectively. The phototaking and finder optical paths $L_b$ and $L_e$ are located in parallel with each other, and an image of a subject is observed through a finder optical system comprising a finder objective, an image erecting prism, a stop and an eyepiece, and is formed on film through the phototaking objective a.

According to the present invention, a zoom lens for use on compact cameras, which, albeit being compact, has a high zoom ratio can be provided at low cost.

What we claim is:

1. A zoom lens system comprising, in order from an object side of said system, a first positive lens group, a second positive lens group and a third negative lens group with a focal length of said system varied with a change in spacings between said lens groups, wherein said first lens group consists of two lenses, a positive lens and a negative meniscus lens concave toward an image side of said system in order from the object side of said system.

2. A zoom lens system of claim 1, wherein said first lens group consists of two lenses, a positive lens and a negative meniscus lens concave toward the image side of the system in order from the object side of the system, with a space located between said positive lens and said negative lens.

3. A zoom lens system of claim 2, which satisfies the following condition (2):

$$-1 < (r_{1R} - r_{2F})/(r_{1R} + r_{2F}) \leq 0 \quad (2)$$

where $r_{1R}$ is a radius of curvature of a surface of the positive lens in the first lens group that faces the image side of the system and $r_{2F}$ is a radius of curvature of a surface of the negative lens in the first lens group that faces the object side of the system.

4. A zoom lens system of claim 2, which satisfies the following condition (1):

$$1 < (r_{2F} + r_{2R})/(r_{2F} - r_{2R}) < 6 \quad (1)$$

where $r_{2F}$ is a radius of curvature of a surface of the negative lens in the first lens group that faces the object side of the system and $r_{2R}$ is a radius of curvature of a surface of the negative lens in the first lens group that faces the image side of the system.

5. A zoom lens system, comprising in order from an object side of said system:
    a first positive lens group:
    a second positive lens group; and
    a third negative lens group,
    wherein a focal length of said system varies with a change in spacing between said lens groups, and
    said first lens group consists of, in order from the object side of said zoom lens system, a positive lens having a larger curvature on the object side and a negative meniscus lens concave toward the image side, and
    said third lens group consists of one negative plastic lens.

6. A zoom lens system of claim 5, which satisfies the following condition (1):

$$1 < (r_{2F} + r_{2R})/(r_{2F} - r_{2R}) < 6 \quad (1)$$

where $r_{2F}$ is a radius of curvature of a surface of the negative lens in the first lens group that faces the object side of the system and $r_{2R}$ is a radius of curvature of a surface of the negative lens in the first lens group that faces the image side of the system.

7. A zoom lens system of claim 1, wherein said first lens group consists of, in order from the object side of said system, a positive lens having a larger curvature on the object side and a negative meniscus lens concave toward the image side, said positive lens and negative meniscus lens being cemented together.

8. A zoom lens system of claim 5, wherein said first lens group consists of two lenses in order from the object side of said system, a positive lens having a larger curvature on the object side and a negative meniscus lens concave toward the image side, said two lenses being cemented together.

9. A zoom lens system of claim 1, wherein said second lens group comprises, in order from the object side of the system, an aperture stop, a negative meniscus lens concave toward the object side of the system and a positive lens, with at least one surface of said positive lens being in an aspheric shape having a positive power decreasing farther off an optical axis of the system, and satisfies the following condition (4):

$$0.27 < D_1/\Sigma D < 0.5 \quad (4)$$

where $D_1$ is a spacing between the aperture stop and the negative lens and $\Sigma D$ is a distance from the aperture stop to a surface of the positive lens that faces the image side of the system.

10. A zoom lens system of claim 1, wherein at least one surface of said third lens group is in an aspheric shape having a negative power decreasing farther off an optical axis of the system.

11. A phototaking optical system built up of a phototaking objective system comprising a zoom lens system as recited in claim 1, 2, 3, 4, 5, 6, 7 or 8, and a light receiving element for receiving an object image formed by said phototaking objective system.

12. A compact camera built up of a finder optical system comprising a viewing objective lens, an image erecting optical system and an eyepiece, and a phototaking optical system with an optical path thereof being independent from that of said finder optical system, wherein said phototaking optical system comprises a zoom lens system as recited in claim 1, 2, 3, 4, 5, 6, 7, or 8.

13. A zoom lens system comprising, in order from an object side of said system, a first positive lens group, a second positive lens group and a third negative lens group with a focal length of said system varied with a change in spacings between said lens groups, wherein:

said first lens group comprises one positive lens and one negative meniscus lens concave toward the image side, and said third lens group consists of one negative plastic lens;

wherein said second lens group comprises one positive lens and one negative lens; and wherein said second lens group comprises, in order from the object side of the system, an aperture stop, a negative meniscus lens concave toward the object side of the system and a positive lens, with at least one surface of said positive lens being in an aspheric shape having a positive power decreasing farther off an optical axis of the system, and said zoom lens system satisfies the following condition (4):

$$0.27 < D_1/\Sigma D < 0.5 \tag{4}$$

where $D_1$ is a spacing between the aperture stop and the negative lens and $\Sigma D$ is a distance from the aperture stop to a surface of the positive lens that faces the image side of the system.

* * * * *